United States Patent [19]

Hopkins

[11] 3,949,953

[45] Apr. 13, 1976

[54] FLUID-PROPELLED TRANSPORTERS

[75] Inventor: Leslie Arthur Hopkins, Southampton, England

[73] Assignee: Air Cushion Equipment Limited, Southampton, England

[22] Filed: Apr. 15, 1974

[21] Appl. No.: 461,234

[30] Foreign Application Priority Data

Apr. 14, 1973 United Kingdom............... 18102/73

[52] U.S. Cl. .................... 243/3; 187/17; 243/32; 243/33; 243/39
[51] Int. Cl.² ...................................... B65G 51/04
[58] Field of Search ............... 243/1, 32, 33, 34, 35, 243/38, 39, 3; 104/138, 155, 156; 187/17; 302/2 R

[56] References Cited

UNITED STATES PATENTS

| 333,397 | 12/1885 | Davis | 243/35 X |
|---|---|---|---|
| 590,181 | 9/1897 | Batcheller | 243/39 |
| 760,471 | 5/1904 | Murphy | 243/35 |
| 839,646 | 12/1906 | Roberts | 243/33 X |
| 867,225 | 9/1907 | Brown | 243/35 |
| 1,240,327 | 9/1917 | Fellows | 243/39 |
| 1,578,723 | 3/1926 | Fellows | 243/39 |
| 1,604,882 | 10/1926 | Cowley | 243/35 |
| 1,787,206 | 12/1930 | MacMartin | 243/32 X |

FOREIGN PATENTS OR APPLICATIONS 10,877 10/1845 United Kingdom.................. 187/17

Primary Examiner—John J. Love
Assistant Examiner—James L. Rowland
Attorney, Agent, or Firm—Holman & Stern

[57] ABSTRACT

An air propelled transporter or "hoist" for use in a mine shaft is provided with a body and inflatable flexible skirt means carried by the body so as to form an air seal with the shaft with the flexible skirt being preferably inflated by the propelling air.

12 Claims, 8 Drawing Figures

FLUID-PROPELLED TRANSPORTERS

BACKGROUND TO THE INVENTION

This application relates to fluid-propelled transporters for use in ducts, that is to say transporters which are propelled along a duct by a fluid pressure force.

As used herein, the term "duct" includes a shaft, tunnel or the like.

SUMMARY OF THE INVENTION

According to the present invention, a fluid-propelled transporter comprises a body and inflatable sealing means carried by the body so as to form a fluid-tight seal between the periphery of the body and the wall of the duct.

The inflatable sealing means is preferably, but not necessarily, inflated by pressure of the propelling fluid.

BRIEF DESCRIPTION OF THE DRAWINGS

An embodiment of the invention will now be described by way of example only with reference to the accompanying drawings, wherein.

DESCRIPTION OF THE PREFERRED EMBODIMENTS

Figure 1:
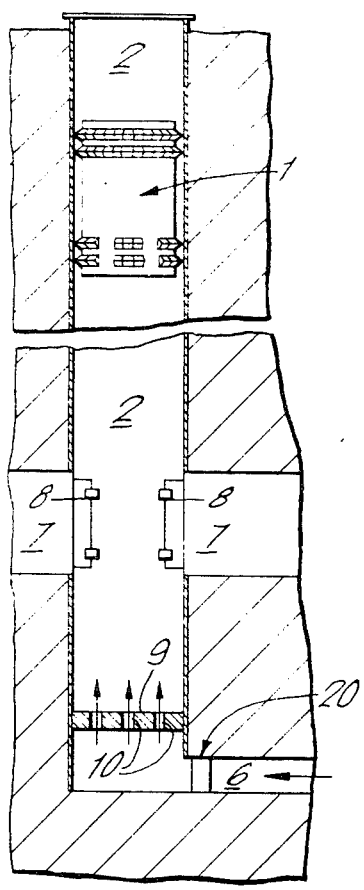
FIG. 1 is a side view, in medial section, of a fluid-propelled transporter disposed in a mine shaft.
Figure 2:
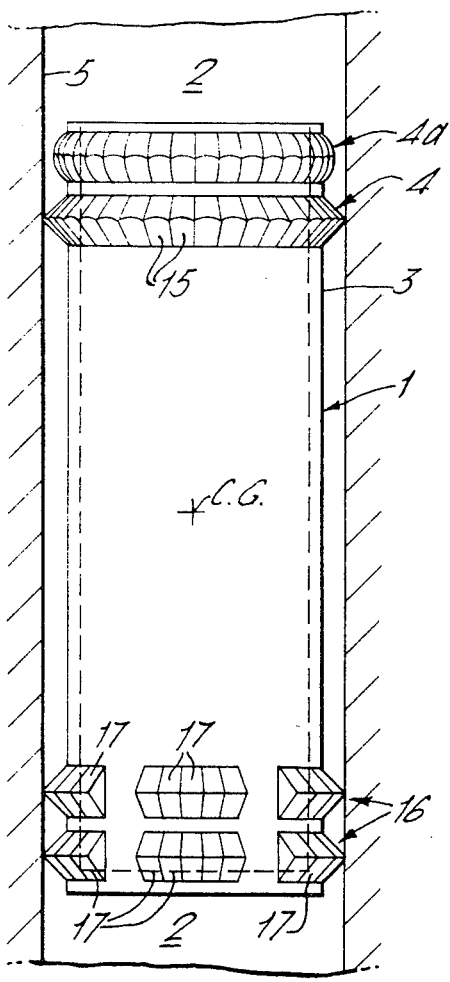
FIG. 2 is an enlarged view of the transporter.
Figure 3:
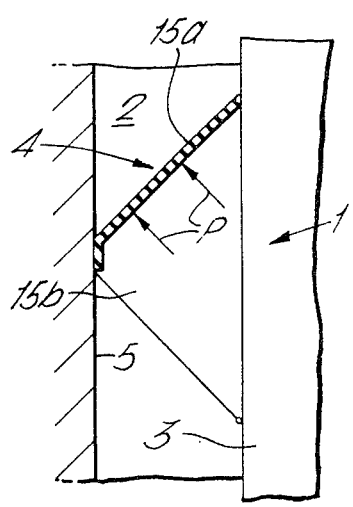
FIG. 3 is an enlarged detail of FIG. 2, and FIGS. 4 to 8 side views, in medial section, of modified transporters.

With reference to FIGS. 1, 2 and 3, a fluid-propelled transporter 1 for use in a vertical duct or mine shaft 2 comprises a cylindrical body 3 and inflatable sealing means 4 carried by the upper part of the body 3 so as to form a fluid-tight seal between the periphery of a body 3 and the wall 5 of the shaft 2.

In further detail, the shaft 2 extends from ground level to terminate at a horizontal shaft 6 about 400 ft. below. Pressurized air (at about 6 lbs. per square inch) is supplied by compressors (not shown) connected to the shaft 6 so that the air flows upwardly through the shaft 2 to propel the transporter 1. The shaft 2 extends through a side shaft 7 also horizontal and spaced about 20 ft. above the shaft 6. The shaft 2, which is of circular cross-section, is steel-lined. Access to the shaft 2 from the shaft 7 is by way of air-tight doors 8 forming part of the shaft lining. The top end of the shaft 2, which is open, is provided with restraining means (not shown) operable to hold the transporter body 3 at the top when required.

The body 3 is of bucket-like form having an open top. At the bottom end of its travel, the body 3 rests on a support 9 provided with through apertures 10 which allow air to pass from the shaft 6 to the shaft 2. When the body 3 rests on the support 9, with the doors 8 open, the interior of the body 3 can be filled with mined material which is transported along the side shaft 7.

With particular reference to FIG. 3, the sealing means 4 comprise an annular ring of independently-deflectable flexible sealing members 15 disposed in contiguous array. The sealing members are of the form disclosed in British Patent specification No. 1,043,351 (H.D.L.) to which reference is directed, and each comprises a generally triangular sheet of flexible material (rubberized fabric) folded over to provide the member with a middle or lateral portion 15a flanked by a pair of side or tie portions 15b. The flexible members 15 which form the sealing means 4 are inflated by air flowing upwardly along the shaft 2. Inflation pressures acting on the lateral portions 15a are represented by the arrows p.

With reference to FIG. 2, a "back-up" flexible seal is provided by sealing 4a. This seal is similar to the sealing means 4 but is normally not inflated, as shown, being prevented by the sealing means 4 which confines air to beneath it. Should, however, the sealing means 4 fail, for example, by loss of or substantial damage to one of its members 15, air flowing past the sealing means 4 will cause the sealing means 4a to inflate.

The sealing members 15 of the sealing means 4 will deflect to centralize the body 3 within the shaft 2. However, to prevent any tendency of the bottom of the body 3 to swing to and fro like a pendulum as the body 3 moves along, stabilizer guide means 16 are provided, disposed well below the center of gravity of the body. The guide means 16 is duplicated, each comprising a plurality of inflatable bags 17 disposed in circumferentially-spaced groups around the periphery of the body 3. The bags 17 have a triangular (vertical) cross-section and are of rubberized fabric. They are permanently inflated to a pressure of little above the propelling pressure of the air in the tunnel 2. The circumferential gaps between adjacent groups of bags 17 allow air to enter the concavities of the flexible members 15 of the sealing means 4.

In operation, assuming the transporter 1 is resting on the support 9, the doors 8 are opened and the body 3 filled. The doors 8 are then closed and pressurized air caused to flow along the shaft 6 to propel the transporter 1 upwardly to the upper end of the shaft 2 where it is arrested and held by the above-mentioned restraining means. The body 3 is then emptied by way of the open, upper end of the shaft 2, while held in place by pressure of air beneath. When it is required to lower the transporter 1 for refilling, the supply of pressurized air to the shaft 2 is reduced or terminated, so that the transporter falls slowly under its own weight.

To limit the speed of its descent under emergency conditions, non-return valve means 20 are disposed in the air supply shaft 6. These means may comprise a ring of flexible members 15 disposed so that air flowing from the shaft 6 to the shaft 2 deflects the ring of flexible members so as to allow the air to pass through whereas air flowing from the shaft 2 to the shaft 6 inflates the flexible members so that they expand to contact each other in an air-sealing relationship.

Figure 4:
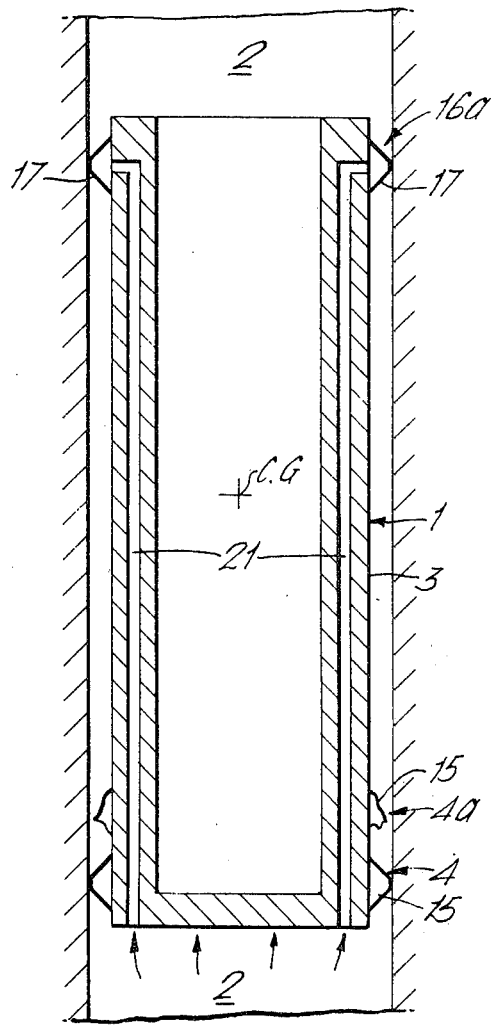

FIG. 4 illustrates a modification wherein the upper end of the body 3 carries annular stabilizing means 16a comprising a plurality of contiguously-disposed flexible bags 17 disposed well above the center of gravity of the body. The bags 17 are inflated by air acting on the bottom of the body 3 and supplied to the bags 17 by way of passageways 21 formed in the wall of the body. The lower end of the body 3 of this modification carries annular seal means 4 and an annular "back-up" sealing means 4a.

In a further modification, the bags 17 may be inflated by a small air compressor unit carried by the body 3.

In yet a further modification, the body 3 comprises a simple frame with a closed upper end. The body 3 does not carry material; this is carried by a skip or similar container disposed on top of the body. The skip may be pivotably mounted on the body 3.

The body 3 may be guided by guide wheels if desired.

Figure 5:
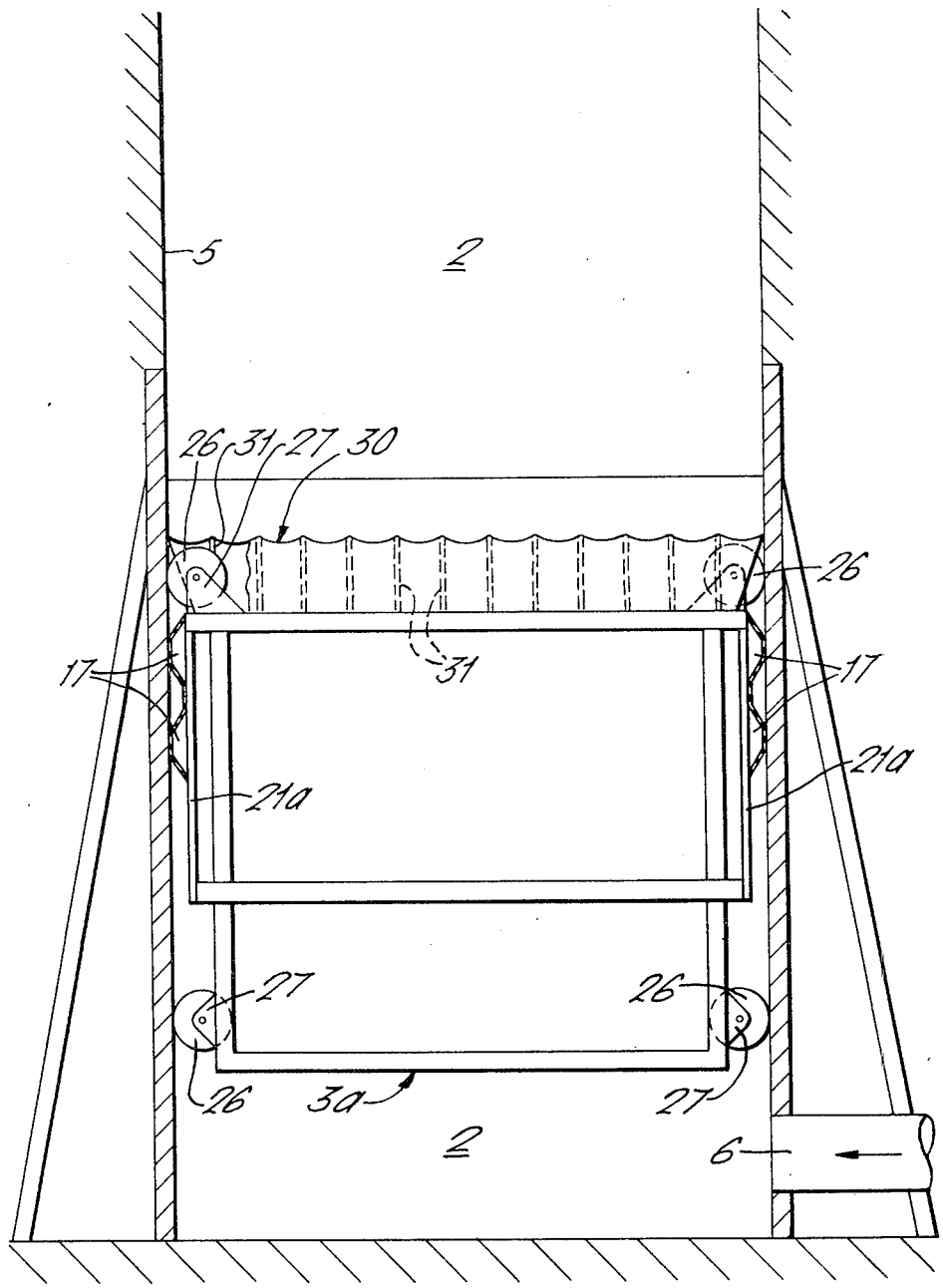

FIG. 5 shows a body 3a provided with upper and lower guide wheels 26 mounted on brackets 27. Upper and lower seals are provided by rings of flexible bags 17 inflated by air supplied by way of an annular duct 21a. Another form of flexible skirt 30 is disposed on top of the body 3a to make a seal with the wall 5 of the shaft 2. The skirt 30 comprises an annular strip of flexible material braced at regular intervals by a series of metal rods 31 disposed in pockets formed in the skirt. The rods 31 are biased, for example, by springs, so as to extend upwardly and outwardly whereby the skirt 30 assumes a frusto-conical form. Gaps are provided in the wall of the skirt 30 to allow free passage of the wheels 26. The skirt 30 serves to impede dust, grit etc. from finding its way between the flexible bags 17 and the wall 5 of the shaft and thus causing excessive wear of the former.

Figure 6:
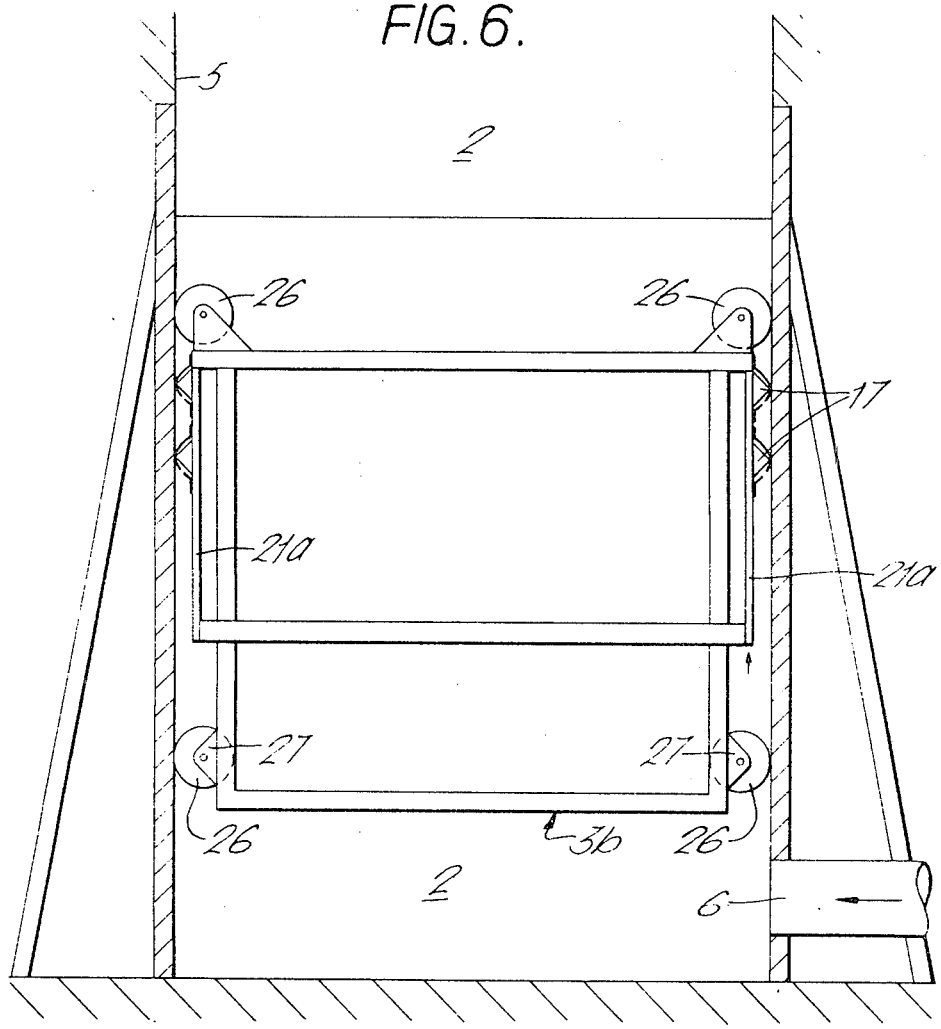
Figure 7:
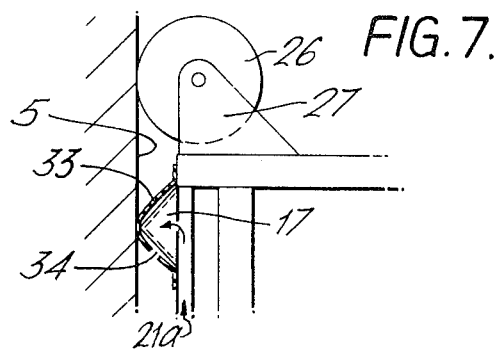

FIGS. 6 and 7 illustrate a similar type of body, namely a body 3b. No "umbrella" skirt 30 is used here but instead the upper and lower rings of flexible bags 17 (see particularly FIG. 7) are protected by annular covers 33 of cheap flexible material and which extend around the bags 17 where they are demountably attached to the body 3b. The covers 33 are penetrated by small apertures 34 which allow air beneath the body 3b to inflate the covers. Wear of the expendable covers 33 is acceptable to that of the bags 17 and the covers 33 are thus sacrificial. The lower bags 17 comprise a primary skirt, and the upper bags 17 an emergency or back-up skirt.

Figure 8:
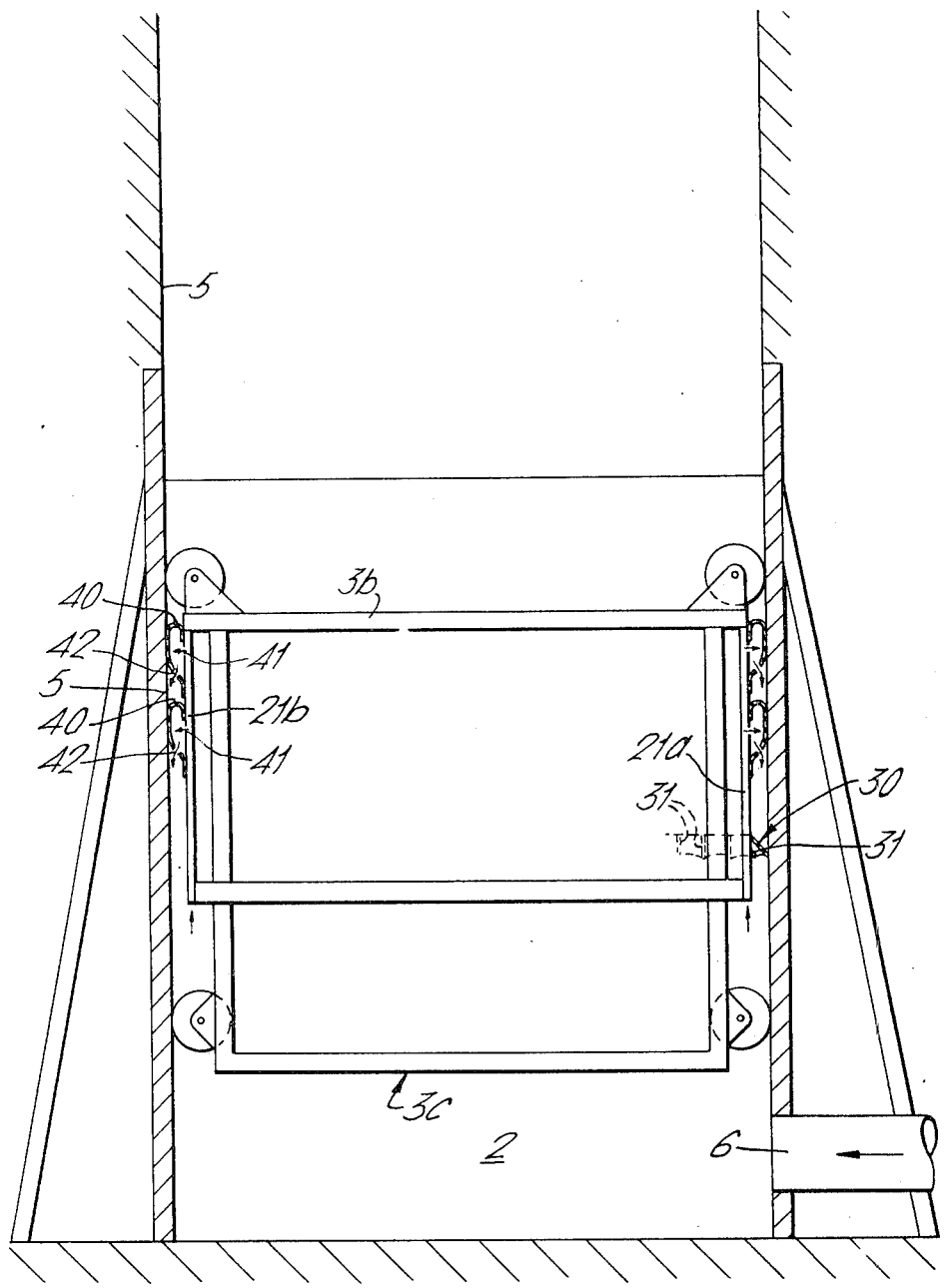

In the arrangement of FIG. 8, the individual flexible bags 17 are replaced by flexible bags 40 of annular form. The bags 40 are inflated by apertures 41 communicating with the annular air supply duct 21a. The bags 40 have vent holes 42 to equalize the pressures across the lower wall parts of the bags 40. A downwardly and outwardly acting "umbrella" skirt 30 restricts passage of air to the bags 40 to the air supply duct 21a. The lower bag 40 is the primary skirt, and the upper bag 40 is an emergency or back-up skirt.

Means may be provided to collapse seal 4 should it start to leak, so as to provide sufficient air to inflate seal 4a. Alternatively, the seal 4 may itself incorporate back-up sealing means.

I claim:

1. A fluid-propelled transporter for use in a duct having a wall, comprising a body having a periphery and sealing means carried by the body so as to form a fluid tight seal between the periphery of the body and the wall of the duct, said sealing means comprising at least one ring of independently deflectable flexible sealing members of hollow, inflatable form, with said members extending around the periphery of the body in side-by-side engagement.

2. The transporter as claimed in claim 1 provided with sacrifical means for covering the bags so as to 3. The transporter as claimed in claim 1, in which the interiors of the sealing members are open to the duct so that when fluid is supplied to the duct for propelling said body along said duct, said sealing members are inflated by the fluid.

4. The transporter as claimed in claim 1, in which said sealing members comprise inflatable bags and passageway means in said body so that when fluid is supplied to said duct for propelling said body along said duct, the bags are inflated by fluid flowing along said passageway means.

5. The transporter as claimed in claim 1, including at least two rings of sealing members, said two rings being axially spaced from each other, whereby one ring of sealing members becomes operable if the other ring of sealing members fails.

6. The transporter as claimed in claim 1, in which the interiors of the sealing members are open to the duct so that when fluid is supplied to the duct for propelling said body along said duct, said sealing members are inflated by the fluid, and further including a second such ring of sealing members, axially spaced from the first ring and serving as body guide means, with said second ring being discontinuous to allow access of the fluid to the interiors of the sealing members of the first ring.

7. The combination of a transporter as claimed in claim 1 and an upright duct having a lower end, said combination being provided with means for supplying pressurized fluid to the lower end of the duct, structural means for supporting the body at the lower end of the duct, and non-return means for restricting back-flow of fluid from the duct.

8. The combination of claim 7, in which the body is hollow and the duct is provided with means for obtaining access to the interior of the body while the body is in the duct.

9. The combination of an upright duct having a wall and a lower end and a transporter body having a periphery, said body being movable along said duct, said body being provided with sealing means to form a fluid-tight seal between the periphery of the body and the wall of the duct, said sealing means comprising an annular member of hollow inflatable form extending around the periphery of the body, means for supplying pressurized fluid to the lower end of the duct and beneath said body, and passageway means in said body for introducing some of the pressurized fluid into the interior of said annular member to inflate said annular member against the wall of the duct.

10. The combination of claim 9 including an additional duct sealing means comprising an annular wall of flexible material carried by said body and disposed about the periphery thereof, and a plurality of bracing struts reinforcing said annular wall.

11. The combination of claim 9, including rotatable guide members for said body, with said guide members contacting the wall of the duct.

12. The combination of claim 9, including structural means for supporting the body at the lower end of the duct, and non-return means for restricting back-flow of fluid from the duct.

* * * * *